(12) United States Patent
Beuschel et al.

(10) Patent No.: US 12,546,862 B2
(45) Date of Patent: Feb. 10, 2026

(54) APPARATUS FOR GENERATING BACKSCATTER HISTOGRAM DATA FOR DETERMINING A DIFFUSE BACKSCATTER DURING AN OPTICAL RUNTIME MEASUREMENT AND A METHOD

(71) Applicant: Microvision, Inc., Redmond, WA (US)

(72) Inventors: Ralf Beuschel, Friedrichshafer (DE); Falko Diebel, Hamburg (DE)

(73) Assignee: Microvision, Inc., Redmond, WA (US)

( * ) Notice: Subject to any disclaimer, the term of this patent is extended or adjusted under 35 U.S.C. 154(b) by 854 days.

(21) Appl. No.: 17/797,095

(22) PCT Filed: Feb. 1, 2021

(86) PCT No.: PCT/EP2021/052286
§ 371 (c)(1),
(2) Date: Aug. 3, 2022

(87) PCT Pub. No.: WO2021/160455
PCT Pub. Date: Aug. 19, 2021

(65) Prior Publication Data
US 2023/0057677 A1 Feb. 23, 2023

(30) Foreign Application Priority Data
Feb. 11, 2020 (DE) .......................... 102020201636.4

(51) Int. Cl.
*G01S 7/48* (2006.01)
*G01S 7/4863* (2020.01)
*G01S 17/894* (2020.01)

(52) U.S. Cl.
CPC .......... *G01S 7/4802* (2013.01); *G01S 7/4863* (2013.01); *G01S 17/894* (2020.01)

(58) Field of Classification Search
None
See application file for complete search history.

(56) References Cited

U.S. PATENT DOCUMENTS

2018/0329061 A1 11/2018 Pacala et al.
2019/0265333 A1* 8/2019 Ueno .................. G01S 7/4808
(Continued)

FOREIGN PATENT DOCUMENTS

CA 107422392 12/2017
CN 109100702 12/2018
(Continued)

OTHER PUBLICATIONS

International Search Report for International application No. PCT/EP2021/052286 mailing date of Apr. 19, 2021.
(Continued)

*Primary Examiner* — Luke D Ratcliffe
(74) *Attorney, Agent, or Firm* — Kevin D. Wills

(57) ABSTRACT

An apparatus for generating backscatter histogram data for determining a diffuse backscatter during an optical runtime measurement, comprising:
At least one histogram accumulation unit, which has several signal inputs, so as to receive time-correlated histogram data; and
wherein the histogram accumulation unit is set up to generate backscatter histogram data based upon the time-correlated histogram data received at the signal inputs.

20 Claims, 2 Drawing Sheets

(56) References Cited

U.S. PATENT DOCUMENTS

2019/0361098 A1* 11/2019 Hollmann ............. G01S 7/4863
2023/0176223 A1* 6/2023 Pacala .................. G01S 17/894
                                                                356/5.01

FOREIGN PATENT DOCUMENTS

| CN | 110187360 | 8/2019 |
| EP | 2824478 | 1/2015 |
| EP | 3435117 A1 | 1/2019 |
| JP | 2019-144184 | 8/2019 |
| WO | 2019102751 A1 | 5/2019 |
| WO | WO20190102751 | 5/2019 |

OTHER PUBLICATIONS

International Search Report for German application No. 10 2020 201 636.4 dated Mar. 4, 2022.

* cited by examiner

APPARATUS FOR GENERATING BACKSCATTER HISTOGRAM DATA FOR DETERMINING A DIFFUSE BACKSCATTER DURING AN OPTICAL RUNTIME MEASUREMENT AND A METHOD

The present invention generally relates to an apparatus for generating backscatter histogram data for determining a diffuse backscatter during an optical runtime measurement, and to a method for generating backscatter histogram data for determining a diffuse backscatter during an optical runtime measurement.

Generally known are different methods for optical runtime measurement, which can be based upon the so-called time-of-flight principle, in which the runtime of a transmitted light signal reflected by an object is measured, so as to determine the distance to the object based upon the runtime.

It is known to use sensors in the motor vehicle environment that are based upon the so-called LIDAR (light detection and ranging) principle, in which pulses are periodically transmitted and the reflected pulses are detected to scan the environment. For example, a corresponding method and a device are known from WO 2017/081294.

In LIDAR applications, the type of detected light signals can generally differ, e.g., depending on whether the transmitted light signal is reflected on a solid object (object backscatter) or by particles present in the air (diffuse backscatter), for example in fog or exhaust gases. Conclusions about the environmental conditions can be drawn from the recorded backscatter data.

Even though solutions for recording backscatter data during optical runtime measurements are known from prior art, an object of the present invention is to provide an apparatus and a method for determining a backscatter during an optical runtime measurement.

This object is achieved by the apparatus according to claim 1 and the method according to claim 15.

In a first aspect, the present invention provides an apparatus for generating backscatter histogram data for determining a diffuse backscatter during an optical runtime measurement, comprising:
At least one histogram accumulation unit, which has several signal inputs, so as to receive time-correlated histogram data, wherein the histogram accumulation unit is set up to generate backscatter histogram data based upon the time-correlated histogram data received at the signal inputs.

In a second aspect, the present invention provides a method for generating backscatter histogram data for determining a diffuse backscatter during an optical runtime measurement comprising:
Receiving several time-correlated histogram data; and generating backscatter histogram data based upon the received time-correlated histogram data.

Additional advantageous of the invention may be gleaned from the subclaims, the drawings and the following description of preferred exemplary embodiments of the present invention.

As mentioned, several exemplary embodiments relate to an apparatus for generating backscatter histogram data for determining a diffuse backscatter during an optical runtime measurement, comprising:
At least one histogram accumulation unit, which has several signal inputs, so as to receive time-correlated histogram data, wherein the histogram accumulation unit is set up to generate backscatter histogram data based upon the time-correlated histogram data received at the signal inputs.

As mentioned at the outset, conclusions can be drawn about environmental conditions from backscatter data during LIDAR measurements. For example, in the case of autonomously driving motor vehicles, a more precise knowledge of the environmental conditions (e.g., fog, etc.) makes it possible to adjust the driving mode to the environmental conditions accordingly, and thereby increase safety. In addition, a precise knowledge of the diffuse backscatter during LIDAR measurements also permits a (more precise) detection of static objects in several exemplary embodiments. For example, this makes it possible to determine traffic situations more precisely, which likewise increases the safety and reliability of autonomous vehicles.

For this reason, the apparatus in some exemplary embodiments is used in a LIDAR system or the like, and for example in the motor vehicle environment, without the invention being limited to these cases.

In some exemplary embodiments, LIDAR data typically contain signal contributions from the backscatter, light reflection on objects, ambient light, sturgeon signals from other light sources in the environment, and the like. These data can be represented in a histogram, which is basically known.

Accordingly, the generation of backscatter histogram data can mean that the generated backscatter histogram data contain at least the signal contribution of the diffuse backscatter, or are formed in such a way that they can basically contain the signal contribution of the diffuse backscatter, and thus are basically suitable for determining the diffuse backscatter during an optical distance measurement.

In some exemplary embodiments, the optical runtime measurement is based upon the so-called TCSPC (time correlated signal photon counting) measuring principle, in particular in exemplary embodiments based upon LIDAR. Light pulses are here typically transmitted, which typically last a few nanoseconds and mark a starting time of a measurement. During the time until the next light pulse (measuring time), the light reflected by objects or backscattered light is detected by a light-detecting receiving element (e.g., a single photon avalanche diode (SPAD)). The measuring time is here divided into a plurality of short time intervals (e.g., 500 ps). Each time interval can then have allocated to it a time corresponding to a time interval to the starting time (e.g., in time intervals of 500 ps, a time of 250 ps can be allocated to a first time interval, and a time of 750 ps can be allocated to a second time interval, etc.)

Depending on the distance to the object or to the point of the backscatter, the light arrives at the light-detecting receiving element at different times.

It here generates an electrical signal in the light-detecting receiving element. A time-to-digital converter (also referred to as "TDC", time-to-digital converter), which is basically known, can then be used to allocate the electrical signal to one of the time intervals. Counting the electrical signals ("events") that are allocated to a time interval gives rise to so-called histograms or time-correlated histograms (also referred to as TCSPC histograms), wherein these histograms can also be present only as pure data, for example, and are stored as value pairs comprised of the time interval and accompanying number of entries (events or events). The time intervals together with the number of events allocated to each time interval ("bin") correspondingly form histogram data, which can basically be represented by digital signals (or also analog signals). Therefore, these typically contain signal contributions from the diffuse backscatter, light reflection on objects, ambient light, sturgeon signals from other light sources in the environment, and the like.

The apparatus contains at least one histogram accumulation unit, which has several signal inputs. In some exemplary embodiments, the maximum number of histogram accumulation units is defined by the number of light-detecting receiving elements in a system for optical runtime measurement (e.g., LIDAR system). The histogram accumulation unit can here basically be or have an electronic circuit, which receives digital signals or data, e.g., the time-correlated histogram data, via the signal inputs, and performs the generation of backscatter histogram data described herein. The electronic circuit can contain electronic components, digital storage elements and the like, so as to perform the functions described herein. The electronic circuit can be realized by an FPGA (field programmable gate array), DSP (digital signal processor) or the like. In other exemplary embodiments, the histogram accumulation unit is realized by a memory and a microprocessor. In other exemplary embodiments, the histogram accumulation unit is realized by a software, wherein the signal inputs correspond to the parameters/attributes of a software function/method in such exemplary embodiments. The generation of backscatter histogram data then corresponds to the execution of a sequence of commands for conducting specific arithmetic operations on a computer, so that backscatter histogram data are present after all commands have been processed. In some exemplary embodiments, the histogram accumulation unit is also realized by a mixture of hardware and software-based components, on which the functionalities described herein are correspondingly distributed.

The histogram accumulation unit receives time-correlated histogram data at the or each signal input. The histogram data here do not always have to be received at each signal input, and some exemplary embodiments provide even more signal inputs, e.g., at which histogram data are not received, or only based on a corresponding configuration.

Time-correlated histogram data are those data which are generated based upon the electrical signals of the light-detecting receiving elements within the (accompanying) measuring time. As mentioned above, these hence typically contain signal contributions from diffuse backscatter, light reflection on objects, ambient light, sturgeon signals from other light sources in the environment, and the like.

In some exemplary embodiments, the received time-correlated histogram data at each signal input are defined by time-correlated histogram data from a light-detecting receiving element. In other exemplary embodiments, the received time-correlated histogram data at each signal input are defined by the sum of time-correlated histogram data from several light-detecting receiving elements. In further exemplary embodiments, the received time-correlated histogram data at each signal input are defined by several time-correlated histogram data from several light-detecting receiving elements.

Backscatter histogram data are generated based upon the time-correlated histogram data received at the signal inputs.

By comparison to ambient light, e.g., in daylight, and the amount of light reflected on objects, the light quantity detected based upon diffuse backscatter is typically low, so that any determination of diffuse backscatter can be difficult and imprecise, in particular in time-correlated histogram data. In some exemplary embodiments, the apparatus is therefore used to generate backscatter histogram data for determining the diffuse backscatter during an optical runtime measurement.

In some exemplary embodiments, the backscatter histogram data here correspond to an accumulation of time-correlated histogram data from several light-detecting receiving elements. The accumulation of time-correlated histogram data can be advantageous for determining the diffuse backscatter, since the signal-to-noise ratio (also referred to as "SNR", signal-to-noise ratio) of the diffuse backscatter contribution is increased by comparison to other signal contributions. In some exemplary embodiments, this makes it possible to better determine the diffuse backscatter.

This is basically because the diffuse backscatter during an optical runtime measurement is typically higher at short distances (e.g., 5 m) than at long distances (e.g., 200 m), and can continuously fall. For determining the diffuse backscatter, the time intervals exceeding a specific threshold value (corresponding to a distance threshold value, e.g., of 20 m) therefore do not have to be considered in some exemplary embodiments for generating the backscatter histogram data.

By contrast, the ambient light is usually constant during the measuring time, and thus typically yields a constant contribution in all time intervals. In like manner, the signal contributions of reflections on objects are often sharp peaks, meaning that the reflected light is only detected in one or a few time intervals, because the light pulse can be received with a weakened amplitude but nearly identical pulse duration. At typical pulse durations, e.g., of 10 ns, a 250 ps time resolution may be required for a precise localization, for example.

During a diffuse backscatter, e.g., on fog or particles in the air, a continuous backscatter can arise as the light propagates with a low intensity. The light pulse can here be greatly expanded or smeared in time. For example, given a 10 ns light pulse with a geometric extension of 1.5 m, a diffuse backscatter over a 1.5 m depth range can be generated at any time. For this reason, a clearly reduced time resolution is sufficient in some exemplary embodiments.

In some exemplary embodiments, a smaller time resolution (distance resolution, e.g., 16 cm for determining the backscatter in comparison to 4 cm for object detection) can thus be selected for determining the diffuse backscatter. In such exemplary embodiments, this can be considered by accumulating the time-correlated histogram data of several time intervals in one time interval.

In addition, the contributions of diffuse backscatter are typically similar over the entire visual field of the LIDAR system, e.g., since fog is not spatially sharply delimited. On the other hand, objects are often only present in a narrow range of the visual field, wherein the visual field describes a spatial area that is being detected. In some exemplary embodiments, a smaller spatial resolution can thus be selected for determining the diffuse backscatter. In such exemplary embodiments, this can be considered by accumulating the time-correlated histogram data of several light-detecting receiving elements.

This is advantageous, since it reduces the data volume for determining the backscatter, thereby reducing the required computing and storage capacities. This also facilitates a lower power consumption.

In some exemplary embodiments, the histogram accumulation unit thus generates the backscatter histogram data by adding together the received time-correlated histogram data.

The number of events that were detected in a time interval can here be added from all received time-correlated histogram data, thereby generating the backscatter histogram data that in each time interval contain precisely the sum of all events in this time interval. The time-correlated histogram data are preferably accumulated or added as integers, so that the weak, diffuse backscatter in some exemplary embodiments can be measured. This is advantageous, since the SNR of the diffuse backscatter contribution can be increased in comparison to other contributions, as described above.

In some exemplary embodiments, the histogram accumulation unit calculates an arithmetic mean from the received time-correlated histogram data, so as to generate the backscatter histogram data.

As described above, the received time-correlated histogram data are here added and divided by the number of signal inputs. This can be advantageous in some exemplary embodiments that have fixed point number or floating point number realization (as opposed to exemplary embodiments that accumulate integers).

In some exemplary embodiments, the histogram accumulation unit accumulates the received time-correlated histogram data of several time intervals in one time interval, so as to generate the backscatter histogram data.

As mentioned above, the distance resolution (time resolution) for determining the diffuse backscatter can be reduced, so as to save on computing and storage capacities, since the signal contribution of the diffuse backscatter can continuously fall, and typically has no sharp peaks.

For this reason, the number of events of several time intervals can be accumulated, preferably added, into one time interval. In such exemplary embodiments, the accumulated time intervals are preferably sequential time intervals (times), and the time interval in which accumulation takes place is preferably a time interval that lies between the minimum and maximum time of the accumulated time intervals.

In some exemplary embodiments, the histogram accumulation unit is further set up not to consider received time-correlated histogram data of time intervals exceeding a specific time threshold for generating the backscatter histogram data.

The diffuse backscatter in an optical runtime measurement is typically no longer detectable at long distances, since the light quantity is too low. For this reason, time intervals for determining the diffuse backscatter that exceed a specific time threshold can be ignored, so as to save on storage and computing capacities.

In such exemplary embodiments, this can be achieved when generating the backscatter histogram data from received time-correlated histogram data by for example only considering those time intervals lying below the time threshold, when adding the received time-correlated histogram data as described above.

In some exemplary embodiments, the histogram accumulation unit is further set up to weight the received time-correlated histogram data for generating the backscatter histogram data.

For example, weighting received time-correlated histogram data can here involve multiplying individual time-correlated histogram data by a factor greater or less than one (e.g., differing for each signal input). In such exemplary embodiments, time-correlated histogram data multiplied by a factor greater than one are weighted higher for generating the backscatter histogram data, and contrarily a factor less than one yields a lower weighting for generating the backscatter histogram data (without limiting the present invention to this example for a weighting).

This can be advantageous, for example if larger contributions by objects or ambient light are present in some time-correlated histogram data, thus making it more difficult to determine the diffuse backscatter based upon these time-correlated histogram data. Accordingly, such time-correlated histogram data can be multiplied by a factor less than one.

In some exemplary embodiments, the histogram accumulation unit is further set up to output the backscatter histogram data for determining the diffuse backscatter. For example, the backscatter histogram data can then be output to a processor, FPGA, or the like for determining the backscatter.

In some exemplary embodiments, the apparatus contains a receiving matrix with several light-detecting receiving elements, wherein each of the light-detecting receiving elements is set up to detect light and generate an electrical signal in response thereto.

The receiving matrix basically involves a three-dimensional body, in particular a plate-shaped body, wherein several light-detecting receiving elements are arranged on a surface or on parts of the surface in one plane, as is basically known.

The receiving matrix can preferably be integrated on a semiconductor chip (e.g., an ASIC "application specific integrated circuit"), wherein the semiconductor chip can have several light-detecting receiving elements, such as SPADs, and several TDCs. In other exemplary embodiments, the receiving matrix can be a printed circuit board with several light-detecting receiving elements mounted on it, wherein a light-detecting receiving element can be an SPAD or the like, for example. The light-detecting receiving element can basically detect very small light quantities (e.g., single photons) with a high time resolution, and generate an electrical signal in response thereto.

In some exemplary embodiments, each of the light-detecting receiving elements can be activated and deactivated. For example, if SPADs are provided as the light-detecting receiving elements, light detection can be interrupted by a change in an electrical voltage applied to the light-detecting receiving element. In such exemplary embodiments, the light-detecting receiving element does not generate an electrical signal during exposure to incident light. This is advantageous, since specific areas of the visual field can be hidden for determining the backscatter.

In some exemplary embodiments, the light-detecting receiving elements in the receiving matrix are arranged in columns and rows (as basically known), wherein the same number of light-detecting receiving elements is provided in each row in some exemplary embodiments, without limitation of generality.

Arranging the light-detecting receiving elements in columns and rows here basically implies an arrangement in a lattice grid, wherein the column and row spacing is preferably constant. Constant is here not to be construed as exactly, but rather also incorporates a production-related tolerance of the column and row spacing in the arrangement of light-detecting receiving elements. The number of columns and rows is here basically not limited, and in the exemplary embodiments typically depends on a concrete requirement, e.g., on the resolution, data volume to be processed, accuracy, etc.

Arranging the light-detecting receiving elements in the receiving matrix in columns and rows is advantageous, since less space is needed as a result, making it more cost-effective. In addition, the receiving matrix is less expensive to manufacture in such exemplary embodiments.

Furthermore, it is advantageous to arrange the same number of light-detecting receiving elements in a row, since in such exemplary embodiments each area of the visual field has the same spatial resolution, and can also be manufactured less expensively.

In some exemplary embodiments, the apparatus comprises several evaluation units, wherein a respective evaluation unit is connected with the light-detecting receiving elements in a column, or a respective evaluation unit is connected with the light-detecting receiving elements in a row.

An evaluation unit can here be an electronic circuit or contain the latter, wherein the electronic circuit can contain electronic components, digital storage elements and the like, so as to perform the functions described herein. The electronic circuit can also be realized by an FPGA (field programmable gate array), DSP (digital signal processor) or the like.

The evaluation unit is connected with the light-detecting receiving elements in such a way that the electrical signals of the light-detecting receiving elements are transmitted to the evaluation unit. In some exemplary embodiments, the evaluation unit is connected with the light-detecting receiving elements via a multiplexer. The evaluation unit can read out a row or column as a whole, or read out only the activated light-detecting receiving elements.

The evaluation unit can have a time-to-digital converter, so as to time the electrical signals of the light-detecting receiving elements and generate time-correlated histogram data for each of the light-detecting receiving elements of a row or column. In other exemplary embodiments, the time-correlated histogram data of a column or row are accumulated in the evaluation unit. The evaluation unit can output the time-correlated histogram data.

In some exemplary embodiments, this is why each of the evaluation units is set up to generate the time-correlated histogram data based upon the electrical signals of the light-detecting receiving elements.

As a consequence, only the light-detecting receiving elements that were activated are considered for generating the time-correlated histogram data in some exemplary embodiments.

In some exemplary embodiments, each signal input of a histogram accumulation unit is correspondingly connected with one of the evaluation units, so that the time-correlated histogram data are transmitted from the evaluation unit to the corresponding histogram accumulation unit.

The method steps described above or herein can also be the subject of a method for generating backscatter histogram data for determining a diffuse backscatter during an optical runtime measurement.

Some exemplary embodiments relate to a method of generating backscatter histogram data for determining a diffuse backscatter during an optical runtime measurement, comprising: Receiving several time-correlated histogram data; and Generating backscatter histogram data based upon the received time-correlated histogram data.

For example, the method can be performed by the apparatus described herein, or by a computer, processor, electronic circuit, or the like.

Exemplary embodiments of the invention will now be exemplarily described with reference to the attached drawing, in which:

FIG. 1 illustrates a diagram of an exemplary embodiment of an apparatus 1.

The apparatus 1 has a receiving matrix 2, which has arranged on it several light-detecting receiving elements (EN×M, in this exemplary embodiment E0,0 to E127,255) in rows (Z0 to Z127) and columns (S0 to S255). M=256 light-detecting receiving elements (E0,0 to E127,255) are arranged in each of the N=128 rows (Z0 to Z127) (corresponding to M=256 columns (S0 to S255)). In this exemplary embodiment, the light-detecting receiving elements (E0,0 to E127,255) are SPADs.

The apparatus 1 further has several evaluation units (A0 to A127), wherein a respective evaluation unit (A0 to A127) is connected with the light-detecting receiving elements (E0,0 to E127,255) of a row (Z0 to Z127) by a multiplexer (not shown). In each row (Z0 to Z127), only the two light-detecting receiving elements (E0,0 and E0,1 to E127,0 and E127,1) are activated in the columns S0 and S1 at any given time (illustrated by the second circle within the light-detecting receiving elements (E0,0 and E0,1 to E127,0 and E127,1)). When light is detected, the activated light-detecting receiving elements (E0,0 and E0,1 to E127,0 and E127,1) generate electrical signals, from which time-correlated histogram data are generated with the help of a time-to-digital converter (not shown) in each of the evaluation units (A0 to A127). In this exemplary embodiment, the time-correlated histograms of the two activated light-detecting receiving elements (E0,0 and E0,1 to E127,0 and E127,1) are added in the evaluation units (A0 to A127), so as to generate and output time-correlated histogram data. In other exemplary embodiments, any desired number of the M=256 light-detecting receiving elements (E0,0 to E127,255) can be activated in each row, e.g., E0,0 to E0,10, E1,0 to E1,10, E2,0 to E2,10, . . . , E127,0 to E127,10.

The apparatus 1 further has several histogram accumulation units (HA0 to HAX). Each histogram accumulation unit (HA0 to HAX) has P=16 signal inputs (not explicitly shown), wherein each signal input is connected with a respective evaluation unit (A0 to A127). In this exemplary embodiment, X=N/P=8 histogram accumulation units are thus required at N=128 rows (Z0 to Z127), which accumulate the time-correlated histogram data of P=16 evaluation units (A0 to A127) accordingly. The time-correlated histogram data output by the evaluation units (A0 to A127) are transmitted to the histogram accumulation units (HA0 to HA6X), so that these are received at the signal inputs. Based upon the received time-correlated histogram data, the histogram accumulation units (HA0 to HAX) generate backscatter histogram data. In this exemplary embodiment, the time-correlated histogram data received at each signal input are added together, so as to generate the backscatter histogram data.

Figure 2:
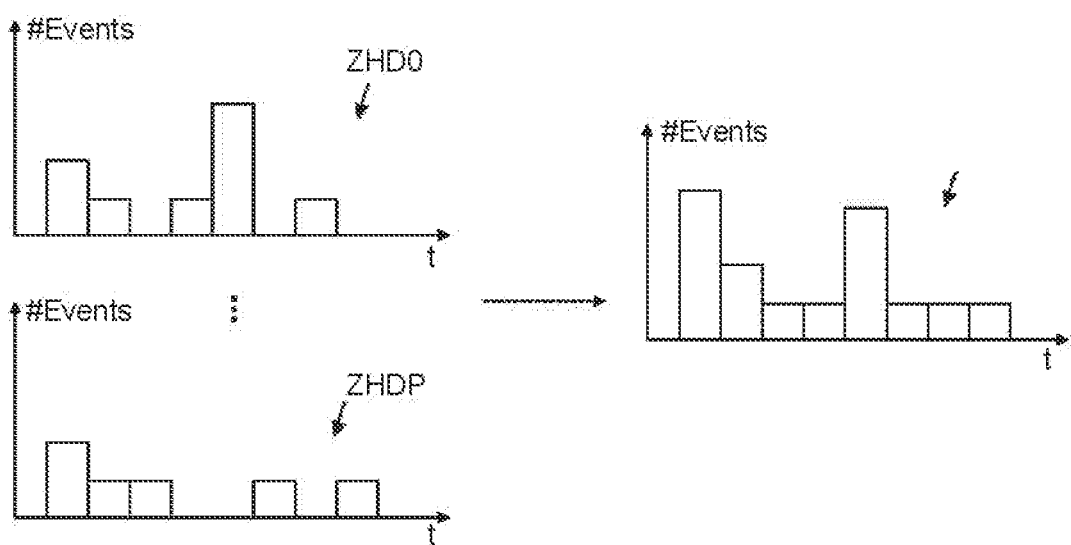
FIG. 2 shows time-correlated histogram data received by two evaluation units in two histograms (upper left and lower left), and the backscatter histogram data generated therefrom in a histogram accumulation unit in a histogram (right)

FIG. 2 exemplarily shows the time-correlated histogram data (ZHD0 to ZHDP) received by two evaluation units (A0 and A1) for two of 16 histograms (upper left and lower right), and shows the backscatter histogram data (RHD0) generated therefrom in a histogram accumulation unit (HA0) in a histogram (right).

Figure 1:
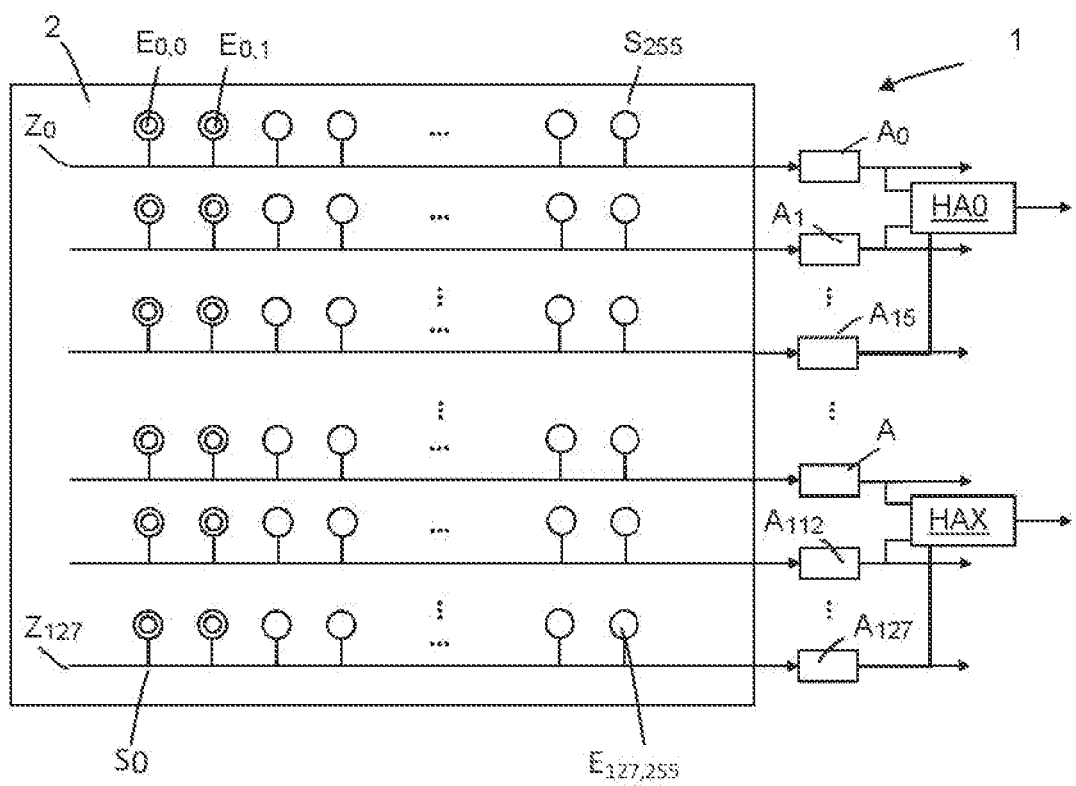
FIG. 1 illustrates a diagram of an exemplary embodiment of an apparatus.

The apparatus 1 in this exemplary embodiment is configured analogously to the apparatus 1 on FIG. 1.

FIG. 2 illustrates how the time-correlated histograms (ZHD0 to ZHDP) generated by 16 evaluation units (A0 to A15) are accumulated.

The horizontal axis is the time axis, which is divided into several identical time intervals ("bins"), and the event is allocated to one of the time intervals depending on the time the light was detected ("event"). The number of events detected within the time interval is illustrated by the height of a bar on the vertical axis. The number of events in each time interval of the time-correlated histogram data (ZHD0 to ZHDP) is added together, so as to generate the backscatter histogram data (RHD0).

The large bar in the fifth time interval of the time-correlated histogram data (ZHD0) from the first evaluation unit (A0) here corresponds to a small object, which is only recorded in a small area of the visual field. However, the contribution of diffuse backscatter is present in the entire visual field before the object at short distances, and thus also present in the two exemplary time-correlated histogram data (ZHD0 to ZHDP). Adding the 16 time-correlated histogram data (ZHD0 to ZHDP) together increases the SNR in the backscatter histogram data (RHD0) in comparison to the contribution by objects and ambient light. This makes the backscatter histogram data (RHD0) better suited for determining a diffuse backscatter during an optical runtime measurement.

Figure 3:
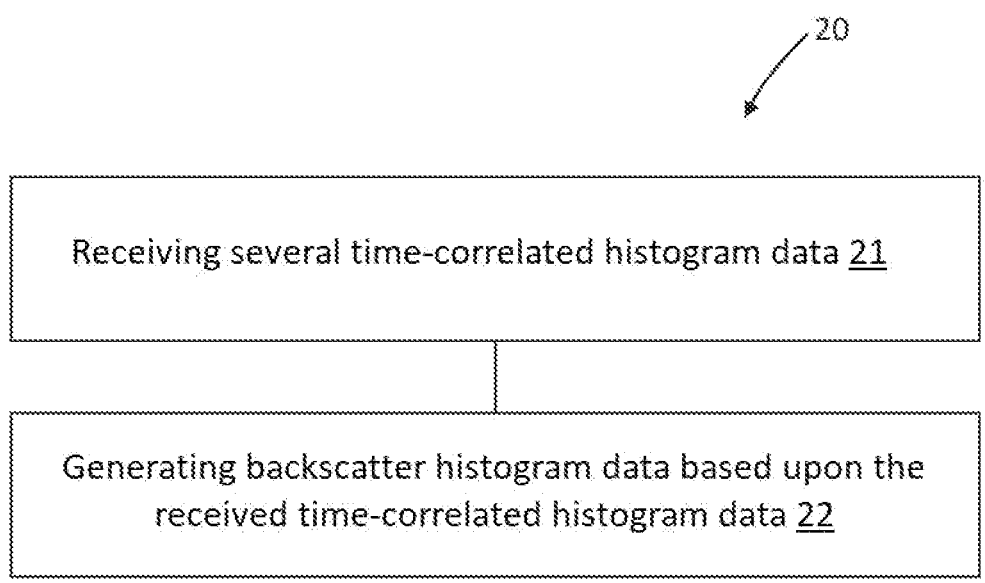
FIG. 3 illustrates a flowchart of an exemplary embodiment of a method.

FIG. 3 illustrates a flowchart for an exemplary embodiment of a method 20.

Several time-correlated histogram data are received at 21, as stated herein.

Backscatter histogram data are generated at 22 based upon the received time-correlated histogram data, as stated herein.

The invention claimed is:

1. An apparatus for generating backscatter histogram data for determining a diffuse backscatter during an optical runtime measurement, comprising:
at least one histogram accumulation unit, wherein the at least one histogram accumulation unit includes a plurality of signal inputs configured to receive time-correlated histogram data derived from electrical signals generated by a plurality of light-detecting receiving elements during the optical runtime measurement, wherein the time-correlated histogram data represent photon detection events distributed across a plurality of time intervals representing distances from the apparatus;
wherein the at least one histogram accumulation unit is configured to accumulate the received time-correlated histogram data into backscatter histogram data by reducing a time resolution of the time-correlated histogram data, the reducing of the time resolution comprising combining photon detection events of multiple adjacent time intervals within the time-correlated histogram data into a single time interval within the backscatter histogram data, such that each single time interval in the backscatter histogram data corresponds to combined photon detection events of the multiple adjacent time intervals in the time-correlated histogram data.

2. The apparatus according to claim 1, wherein the histogram accumulation unit calculates an arithmetic mean from the time-correlated histogram data, so as to generate the backscatter histogram data.

3. The apparatus according to claim 1, wherein the histogram accumulation unit is further set up not to consider received time-correlated histogram data of time intervals exceeding a specific time threshold for generating the backscatter histogram data.

4. The apparatus according to claim 1, wherein the histogram accumulation unit is further set up to weight the received-time-correlated histogram data for generating the backscatter histogram data.

5. The apparatus according to claim 1, wherein the histogram accumulation unit is further set up to output the backscatter histogram data.

6. The apparatus according to claim 1, further comprising:
a receiving matrix with several light-detecting receiving elements, wherein each of the light-detecting receiving elements is configured to detect light and generate an electrical signal in response thereto.

7. The apparatus according to claim 6, wherein each of the light-detecting receiving elements can be activated and deactivated.

8. The apparatus according to claim 6, wherein the light-detecting receiving elements in the receiving matrix are arranged in columns and rows, wherein a same number of light-detecting receiving elements is provided in each row.

9. The apparatus according to claim 8, further comprising:
a plurality of evaluation units, wherein a respective evaluation unit is connected with the light-detecting receiving elements in a column, or a respective evaluation unit is connected with the light-detecting receiving elements in a row.

10. The apparatus according to claim 9, wherein each of the evaluation units is set up to generate the time-correlated histogram data based upon the electrical signals of the light-detecting receiving elements.

11. The apparatus according to claim 10, wherein only the light-detecting receiving elements that are activated are considered for generating the time-correlated histogram data.

12. The apparatus according to claim 1, wherein each signal input is connected with one of the evaluation units, so that the time-correlated histogram data are transmitted from the evaluation unit to the corresponding histogram accumulation unit.

13. A method of generating backscatter histogram data for determining a diffuse backscatter during an optical runtime measurement, comprising:
receiving optical signals during the optical runtime measurement from a plurality of light-detecting sensors configured to detect optical signals, wherein the plurality of light-detecting sensors are individually selectable for activation or deactivation to enable selective data acquisition;
generating time-correlated histogram data, wherein bins in the time-correlated histogram data represent distances from the apparatus;
processing the time-correlated histogram data to accumulate at least a portion of the data received from the plurality of light-detecting sensors; and
generating backscatter histogram data corresponding to at least a diffuse backscatter element, wherein the backscatter histogram data is generated with a reduced time resolution corresponding to wider bins as compared to the time-correlated histogram data.

14. The method of claim 13, wherein generating the backscatter histogram data comprises accumulating the time-correlated histogram data of several consecutive time intervals into one time interval to reduce the time resolution, such that the reduced time resolution improves computational and storage efficiency while maintaining sufficient accuracy for determining the diffuse backscatter.

15. The method according to claim 13, wherein the generating the backscatter histogram data further comprises not considering received time-correlated histogram data of time intervals exceeding a specific time threshold for generating the backscatter histogram data.

16. The method according to claim 13, wherein the generating the backscatter histogram data further comprises weighting the time-correlated histogram data for generating the backscatter histogram data.

17. An apparatus for generating backscatter histogram data for determining a diffuse backscatter during an optical runtime measurement, comprising:
   a plurality of light-detecting sensors configured to detect optical signals during the optical runtime measurement and generate time-correlated histogram data where bins in the time-correlated histogram data represent distances from the apparatus, wherein each of the plurality of light-detecting sensors is individually selectable for activation or deactivation to enable selective data acquisition;
   at least one histogram accumulation unit having a plurality of signal inputs configured to receive the time-correlated histogram data generated by the plurality of light-detecting sensors, wherein the histogram accumulation unit is configured to process the time-correlated histogram data to generate backscatter histogram data corresponding to at least a diffuse backscatter element, wherein the backscatter histogram data is generated by accumulating at least a portion of the time-correlated histogram data from multiple signal inputs, and wherein the backscatter histogram data is generated with a reduced time resolution corresponding to wider bins as compared to the time-correlated histogram data.

18. The apparatus of claim 17, wherein the histogram accumulation unit is further configured to filter the time-correlated histogram data based on intensity thresholds to enhance the accuracy of the backscatter histogram data.

19. The apparatus of claim 17, wherein the plurality of light-detecting sensors include single-photon avalanche diodes (SPADs) configured to operate in Geiger mode.

20. The apparatus of claim 17, further comprising at least one control unit configured to dynamically adjust the activation or deactivation of the plurality of light-detecting sensors based on predefined conditions, including the level of optical backscatter detected.

* * * * *